(12) United States Patent
Erward et al.

(10) Patent No.: US 8,414,170 B2
(45) Date of Patent: Apr. 9, 2013

(54) PRODUCTION METHOD FOR A HEADLIGHT LENS AND HEADLIGHT LENS FOR A MOTOR VEHICLE HEADLIGHT

(75) Inventors: Klaus Erward, Saalburg-Ebersdorf (DE); Franz Sykura, Schleiz/Lossau (DE)

(73) Assignee: Doctor Optics GmbH (DE)

( * ) Notice: Subject to any disclaimer, the term of this patent is extended or adjusted under 35 U.S.C. 154(b) by 0 days.

(21) Appl. No.: 13/532,998

(22) Filed: Jun. 26, 2012

(65) Prior Publication Data

US 2012/0287661 A1    Nov. 15, 2012

Related U.S. Application Data

(63) Continuation of application No. 12/519,704, filed as application No. PCT/DE2007/002260 on Dec. 13, 2007, now Pat. No. 8,251,557.

(30) Foreign Application Priority Data

Dec. 18, 2006    (DE) .......................... 10 2006 060 141

(51) Int. Cl.
    *F21V 5/00*    (2006.01)
(52) U.S. Cl.
    USPC ............ 362/520; 362/522; 362/536; 362/487
(58) Field of Classification Search ........... 362/459–549
    See application file for complete search history.

(56) References Cited

U.S. PATENT DOCUMENTS

| 3,708,221 A | 1/1973 | Schaefer |
| 5,922,250 A | 7/1999 | Ishikawa et al. |
| 2003/0210466 A1 | 11/2003 | Huang |
| 2005/0024889 A1 | 2/2005 | Sugimoto |
| 2005/0225999 A1 | 10/2005 | Bucher |
| 2005/0254254 A1 | 11/2005 | Moseler et al. |
| 2006/0072208 A1 | 4/2006 | Bonitz et al. |

FOREIGN PATENT DOCUMENTS

| BE | 393553 | 2/1933 |
| CN | 1769228 | 5/2006 |
| DE | 198 29 586 | 1/2000 |
| DE | 100 43 065 | 3/2002 |
| DE | 100 52 653 | 5/2002 |

(Continued)

OTHER PUBLICATIONS

Japanese version of Jul. 24, 2012 Office Action for Application No. 2009-541752 (Japan).

(Continued)

*Primary Examiner* — William Carter
(74) *Attorney, Agent, or Firm* — Barnes & Thornburg LLP

(57) ABSTRACT

The present disclosure is directed to a method for manufacturing a batch of motor vehicle headlight lenses, each lens comprising a lens body and a convexly curved optically operative surface. The method comprising pressing a pre-form between a first mold and a second mold, which second mold comprises a first and second mold sections. An offset depending on the volume of the pre-form a step is pressed into the headlight lens between the second mold section and the first mold section, wherein the first mold section is set back with respect to the second mold section at least in the region of the offset, and wherein the height of a step of a headlight lens of the batch differs by more than 0.05 mm from the height of a step of at least one further headlight lens of the batch.

32 Claims, 8 Drawing Sheets

FOREIGN PATENT DOCUMENTS

Figure 1:
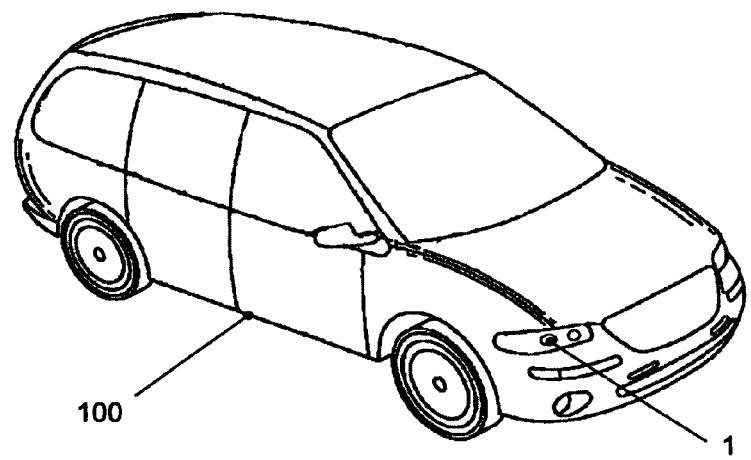

| | | |
|---|---|---|
| DE | 101 18 687 | 10/2002 |
| DE | 20 2004 005 936 | 4/2004 |
| DE | 203 20 546 | 4/2005 |
| DE | 10 2005 009 556 | 9/2005 |
| DE | 10 2004 048 500 | 4/2006 |
| DE | 20 2006 005 261 | 7/2006 |
| EP | 0 969 246 | 1/2000 |
| EP | 1 584 863 | 10/2005 |
| EP | 1 645 545 | 4/2006 |
| GB | 1289776 | 9/1972 |
| JP | 59-157603 | 9/1984 |
| JP | 2001-189104 | 7/2001 |
| JP | 2005-112673 | 4/2005 |
| JP | 2006-10454 | 4/2006 |
| WO | 02/31543 | 4/2002 |
| WO | 03/074251 | 9/2003 |

OTHER PUBLICATIONS

English Translation of Jul. 24, 2012 Office Action for Application No. 2009-541752 (Japan).

Korean Patent Abstracts No. 1020030069714, "High-Refractive Focusing Lens for Optical Storage and Regeneration Unit and Fabricating Method Thereof", filed Feb. 22, 2002.

Internationals Search Report and Written Opinion of the International Search Authority mailed Dec. 24, 2008 for International Application No. PCT/DE2007/000158.

PRODUCTION METHOD FOR A HEADLIGHT LENS AND HEADLIGHT LENS FOR A MOTOR VEHICLE HEADLIGHT

CROSS-REFERENCE TO RELATED APPLICATIONS

This is a continuation of prior U.S. application Ser. No. 12/519,704, filed Jun. 17, 2009 which is a national phase of PCT/DE2007/002260 filed Dec. 13, 2007. PCT/DE2007/002260 claims the benefit under the Convention of German Patent Application No. 10 2006 060 141.6 filed Dec. 18, 2006, the contents of this application is hereby incorporated herein by reference.

The invention relates to a headlight lens for a vehicle headlight, in particular for a motor vehicle headlight, as well as to a vehicle headlight.

A headlight lens of that type is e.g. known from U.S. Pat. No. 3,708,221, WO 02/31543 A1, WO 03/074251 A1 and DE 100 52 653 A1. Further types of vehicle headlights are known e.g. from DE 100 33 766 A1, DE 101 18 687 A1 and DE 198 29 586 A1.

DE 203 20 546 U1 discloses a lens blank-moulded on both sides and having a curved surface, a planar surface and a retention edge integrally moulded on the lens edge, wherein a supporting edge of a thickness of at least 0.2 mm and projecting with respect to the planar surface is integrally formed on the retention edge. Herein, the supporting edge is integrally formed on the outer circumference of the headlight lens. A further headlight lens having a supporting edge is disclosed e.g. by DE 10 2004 048 500 A1.

DE 20 2004 005 936 U1 discloses a lens for illuminating purposes, in particular a lens for a headlight for mapping or imaging light emitted from a light source and reflected by a reflector for generating a predetermined illumination pattern, said lens having two surfaces opposing each other, wherein areas of different optical dispersion effects are provided on at least a first surface.

EP 0 969 246 A2 discloses an over-dimensioned lens, wherein the lens grinding and the corresponding projection plane and projection parameter of the reflector mirror are dimensioned such with respect to the lens that only an interior partial area of the lens is used directly. The over-dimensioned edge area merely serves for an optical magnification of the headlight design.

With respect to their optical properties or their photometric standards, headlight lenses are subject to narrow criteria of design. This particularly applies to a light and dark borderline 75, as has been represented, by way of example, in a diagram 70 and a photo 71 in FIG. 9. Herein, the gradient G of the light and dark borderline 75 and the glare value HV of the vehicle headlight into which the headlight lens is installed are important photometric standard values.

It is the object of the invention to reduce the costs in manufacturing a headlight lens for a vehicle headlight, in particular for a motor vehicle headlight, without exceeding photometric standard values.

The aforementioned problem is solved by a method for producing a headlight lens for a vehicle headlight, in particular for a motor vehicle headlight, wherein the headlight lens comprises a lens body made from transparent material and having an essentially planar, optically operative surface and a convexly curved, optically operative surface, wherein, in order to form the headlight lens having an integrally formed lens edge, a pre-form is blank-moulded between a first mould for pressing the convexly curved, optically operative surface and a second mould for pressing the essentially planar, optically effective surface, which second mould comprises a first mould section and an annular second mould section enclosing the first mould section, wherein, by means of an offset depending on the volume of the pre-form, a step is pressed into the headlight lens between the second mould section and the first mould section, and wherein the first mould section is set back with respect to the second mould section at least in the region of the offset.

In particular, it is provided that the essentially planar, optically operative surface is an optically operative surface to be made facing a light source. In particular, it is provided that the convexly curved, optically operative surface is an optically operative surface to be made facing away from a light source. In an advantageous embodiment, the convexly curved, optically operative surface is aspherical.

In the sense of the invention, the transparent material is in particular glass. In the sense of the invention, the term blank-moulding is to mean, in particular, that an optically operative surface is to be pressed such that a subsequent finishing step of the contour of this optically operative surface may be dispensed with or is omitted or is not provided. An integrally formed lens edge, when taken in the sense of the invention, is in particular not to comprise an optically operative surface.

In one embodiment of the invention, the step extends essentially parallel to the optical axis of the headlight lens. In another embodiment, the step is (if necessary additionally) inclined with respect to the optical axis of the headlight lens in the direction of the optical axis.

In a yet further advantageous embodiment of the invention, the distance between the first mould section and the first mould is dependent on the volume of the pre-form. In a further advantageous embodiment of the invention, the distance between the second mould section and the first mould is independent of the volume of the pre-form. In a yet further preferred embodiment of the invention, the second mould section contacts the first mould. In a still further advantageous embodiment of the invention, a contact shoulder is pressed into the lens edge by means of the first mould, wherein the contact shoulder expediently extends essentially orthogonally with respect to the optical axis of the headlight lens.

In a yet further advantageous embodiment of the invention, the essentially planar, optically operative surface projects by no more than 1 mm, advantageously by not more than 0.5 mm beyond the lens edge or a part of the lens edge when seen in the direction of the optical axis of the headlight lens. This in particular means that the height of one step amounts to no more than 1 mm, advantageously no more than 0.5 mm.

In a further expedient embodiment of the invention, the thickness of the lens edge amounts to at least 2 mm. In a yet further advantageous embodiment of the invention, the thickness of the lens edge amounts to no more than 5 mm.

In a still further advantageous embodiment of the invention, the diameter of the headlight lens amounts to at least 40 mm. In a yet further advantageous embodiment of the invention, the diameter of the headlight lens amounts to no more than 100 mm.

In still another advantageous embodiment of the invention, the diameter of the essentially planar, optically operative surface amounts to no more than 110% of the diameter of the convexly curved, optically operative surface. In a still further expedient embodiment of the invention, the diameter of the essentially planar, optically operative surface amounts to at least 90% of the diameter of the convexly curved, optically operative surface.

In one embodiment of the invention, the essentially planar, optically operative surface and/or the convexly curved, optically operative surface is round, in particular circular, or essentially circular.

In a furthermore advantageous embodiment of the invention, the surface of the lens edge or essentially a predominant or at least a predominant or essential portion of the surface of the lens edge extends essentially parallel to the optical axis of the headlight lens along the outer circumference of the lens edge. In this sense, essentially parallel to the optical axis is to mean or is to comprise in particular an inclination of 0° up to 8°, in particular 0° to 5°, with respect to the optical axis.

In one embodiment, the essentially planar, optically operative surface and/or the convexly curved, optically operative surface has a roughness of less than 0.1 μm, in particular less than 0.08 μm, at least in more than one half thereof or essentially in its totality. Roughness in the sense of the invention is in particular to be defined as Ra, in particular according to ISO 4287.

The above-mentioned problem is moreover solved by a method for producing a batch of, in particular, at least sixteen or at least fifty-three headlight lenses for a vehicle headlight, wherein the headlight lenses of the batch are blank-moulded according to the aforementioned process. In an advantageous embodiment of the invention, the batch comprises at least five hundred headlight lenses. In a further advantageous embodiment of the invention, the headlight lenses are placed in a transport container for transporting the headlight lenses. In yet a further expedient embodiment of the invention, the height of one step of a headlight lens of the batch differs by more than 0.05 mm, advantageously by more than 0.1 mm, from the height of a step of a further headlight lens of the batch. In one embodiment of the invention, the step extends essentially parallel to the optical axis of the headlight lens. In a further embodiment, the step is, if necessary additionally, inclined with respect to the optical axis of the headlight lens when seen in the direction of the optical axis.

The above-mentioned problem is moreover solved by a batch of, in particular, at least sixteen or at least fifty-three blank-moulded headlight lenses for vehicle headlights having an integrally moulded lens edge, wherein each one of the headlight lenses of the batch comprises one lens body, each, made of transparent material with an essentially planar, optically operative surface, each, and a convexly curved, optically operative surface, each, wherein the essentially planar, optically operative surfaces project, in the form of a step and when seen in the direction of each optical axis of a headlight lens, beyond the respective lens edge or part of the respective lens edge, and wherein the height of a step of a headlight lens of the batch differs by more than 0.05 mm, advantageously by more than 0.1 mm, from the height of a step of a further headlight lens of the batch. In one embodiment of the invention, the step extends essentially parallel to the optical axis of the headlight lens. In another embodiment, the step is, if necessary in addition, inclined with respect to the optical axis of the headlight lens when seen in the direction of the optical axis.

In an expedient embodiment of the invention, the batch comprises at least five hundred headlight lenses. In a further advantageous embodiment of the invention, the headlight lenses of the batch have one contact shoulder, each, on the lens edge situated on the side of the respective headlight lenses facing away from the step, wherein the contact shoulder advantageously extends essentially orthogonally with respect to the optical axis of the headlight lens.

In a further expedient embodiment of the invention, the essentially planar, optically operative surface projects, when seen in the direction of the optical axis of the headlight lens, beyond the lens edge or part of the lens edge by no more than 1 mm, advantageously by no more than 0.5 mm. This, in particular, means that the height of one step is no more than 1 mm, advantageously no more than 0.5 mm.

In yet a further expedient embodiment of the invention, the thickness of the lens edge is at least 2 mm. In a yet further advantageous embodiment of the invention, the thickness of the lens edge is no more than 5 mm.

In a yet further advantageous embodiment of the invention, the diameter of the headlight lens amounts to at least 40 mm. In a furthermore advantageous embodiment of the invention, the diameter of the headlight lens amounts to no more than 100 mm.

In a still further expedient embodiment of the invention, the diameter of the essentially planar, optically operative surface amounts to no more than 110% of the diameter of the convexly curved, optically operative surface. In a yet further expedient embodiment of the invention, the diameter of the essentially planar, optically operative surface amounts to at least 90% of the diameter of the convexly curved, optically operative surface.

In one embodiment of the invention, the essentially planar, optically operative surface and/or the convexly curved, optically operative surface is round, in particular circular or essentially circular.

In a yet further expedient embodiment of the invention, the surface of the lens edge or at least a predominant or essential part of the surface of the lens edge extends along the outer circumference of the lens edge essentially parallel to the optical axis of the headlight lens. In the sense thereof, "essentially parallel to the optical axis" is to mean or comprise, in particular, an inclination with respect to the optical axis of 0° to 8°, in particular 0° to 5°.

The essentially planar, optically operative surface and/or the convexly curved, optically operative surface in one embodiment has, in more than half thereof or essentially in its totality, a roughness of less than 0.1 μm, in particular of less than 0.08 μm. Roughness, in the sense of the invention, is to be defined, in particular, as Ra, particularly according to ISO 4287.

The aforementioned is moreover solved by a transport container for transporting headlight lenses, wherein a plurality of headlight lenses for vehicle headlights, in particular for motor vehicle headlights, is arranged in the transport container, wherein each one of the headlight lenses of said plurality of headlight lenses comprises a blank-moulded lens body made of transparent material with one essentially planar, optically operative surface, each, and with one convexly curved, optically operative surface, each, and wherein each of the headlight lenses of the plurality of headlight lenses externally comprises one lens edge, each, on their convexly curved, optically operative surfaces, wherein the essentially planar, optically operative surfaces, when seen in the direction of the respective optical axis of a headlight lens, project, in the form of a step, beyond the respective lens edge or a part of the respective lens edge, and wherein the height of one step of a headlight lens of said plurality of headlight lenses differs by more than 0.05 mm, preferably by more than 0.1 mm, from the height of a step of a further headlight lens of said plurality of headlight lenses. In one embodiment of the invention, the step extends essentially parallel to the optical axis of the headlight lens. In another embodiment, the step is, if necessary additionally, inclined with respect to the optical axis of the headlight lens when seen in the direction of the optical axis.

The aforementioned problem is moreover solved by a headlight lens for a vehicle headlight, in particular for a motor vehicle headlight, wherein the headlight lens comprises a blank-moulded lens body made from transparent material and having an essentially planar, optically operative surface and a convexly curved, optically operative surface, and wherein the headlight lens, on the convexly curved, optically operative surface, externally comprises a lens edge, wherein the essentially planar, optically operative surface, when seen in the direction of an optical axis of the headlight lens, projects beyond the lens edge or a part of the lens edge in a stepped manner, and wherein the headlight lens has a contact shoulder on the lens edge on the side of the headlight lens facing away from the step, wherein the contact shoulder advantageously extends essentially orthogonally with respect to the optical axis of the headlight lens, and wherein the essentially planar, optically operative surface advantageously has a roughness of less than 0.1 µm, in particular of less than 0.8 µm. Roughness, in the sense of the invention, is particularly to be defined as Ra, in particular according to ISO 4287.

In one embodiment of the invention, the step extends essentially parallel to the optical axis of the headlight lens. In another embodiment, the step is, if necessary in addition, inclined with respect to the optical axis of the headlight lens when seen in the direction of the optical axis.

In a yet further expedient embodiment of the invention, the essentially planar, optically operative surface projects beyond the lens edge or a part of the lens edge, when seen in the direction of the optical axis, by not more than 1 mm, expediently by not more than 0.5 mm. This, in particular, means that the height of one step amounts to no more than 1 mm, advantageously to no more than 0.5 mm.

In a further expedient embodiment of the invention, the thickness of the lens edge amounts to at least 2 mm. In a further expedient embodiment of the invention, the thickness of the lens edge amounts to no more than 5 mm.

In yet a further advantageous embodiment of the invention, the diameter of the headlight lens amounts to at least 40 mm. In still a further advantageous embodiment of the invention, the diameter of the headlight lens amounts to no more than 100 mm.

In a further advantageous embodiment of the invention, the diameter of the essentially planar, optically operative surface amounts to no more than 110% of the diameter of the convexly curved, optically operative surface. In a yet further advantageous embodiment of the invention, the diameter of the essentially planar, optically operative surface amounts to at least 90% of the diameter of the convexly curved, optically operative surface.

In one embodiment of the invention, the essentially planar, optically operative surface and/or the convexly curved, optically operative surface is round, in particular circular or essentially circular.

In one embodiment, the convexly curved, optically operative surface has, for more than half of it or taken essentially in its totality, a roughness of less than 0.1 µm, in particular of less than 0.8 µm. Roughness, in the sense of the invention, is particularly to be defined as Ra, in particular according to ISO 4287.

The aforementioned problem is furthermore solved by a vehicle headlight, in particular a motor vehicle headlight, having a light source, a shield and a headlight lens in particular comprising one or several of the above-mentioned features, for imaging an edge of the shield as a light and dark borderline, wherein the headlight lens comprises a blank-moulded lens body made from transparent material and having a particularly essentially planar, optically operative surface facing the light source and a particularly convexly curved, optically operative surface facing away from the light source, and wherein the headlight lens, on the optically operative surface facing away from the light source, externally comprises a lens edge, wherein the optically operative surface facing the light source projects beyond the lens edge or a part of the lens edge when seen in the direction of an optical axis of the headlight lens and/or in the direction of the light source, wherein a step is provided between the optically operative surface facing the light source and a surface of the lens edge facing the light source, wherein the headlight lens has a contact shoulder advantageously on the lens edge on the side of the headlight lens facing away from the step, and wherein the essentially planar, optically operative surface advantageously has a roughness of less than 0.1 µm, in particular of less than 0.08 µm. Roughness, in the sense of the invention, is particularly to be defined as Ra, in particular according to ISO 4287. In one embodiment of the invention, the step extends essentially parallel to the optical axis of the headlight lens. In another embodiment, the step is, if necessary additionally, inclined with respect to the optical axis of the headlight lens when seen in the direction of the optical axis.

In an expedient embodiment of the invention, the vehicle headlight is (at least as well) formed as a non-dazzling headlight. In yet a further advantageous embodiment of the invention, the gradient of the light and dark borderline is no more than 0.5. In a yet further advantageous embodiment of the invention, the glare value of the vehicle headlight is no more than 1.5 Lux.

The above-mentioned problem is moreover solved by a vehicle having an aforementioned vehicle headlight, wherein the light and dark borderline may, in an advantageous embodiment of the invention, be imaged on a roadway on which the motor vehicle may be arranged.

The height of the aforementioned steps advantageously amounts to at least 0.1 mm.

It may be provided that an essentially planar, optically operative surface comprises a (concave) curvature having a radius of curvature in the order of 0.5 m.

Figure 2:
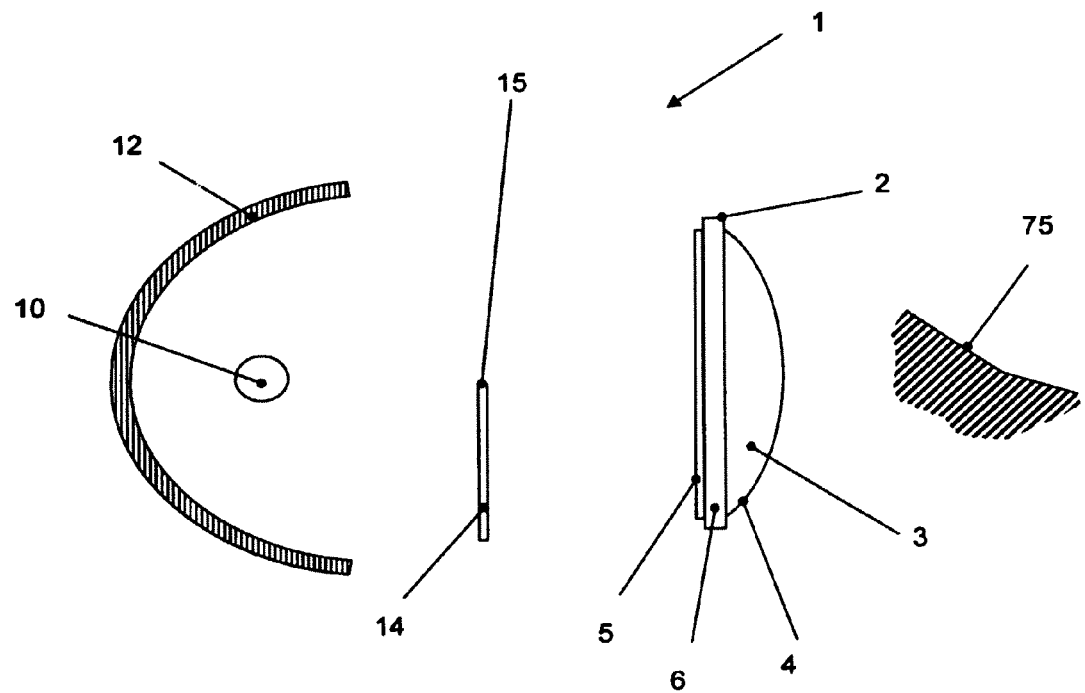
Figure 3:
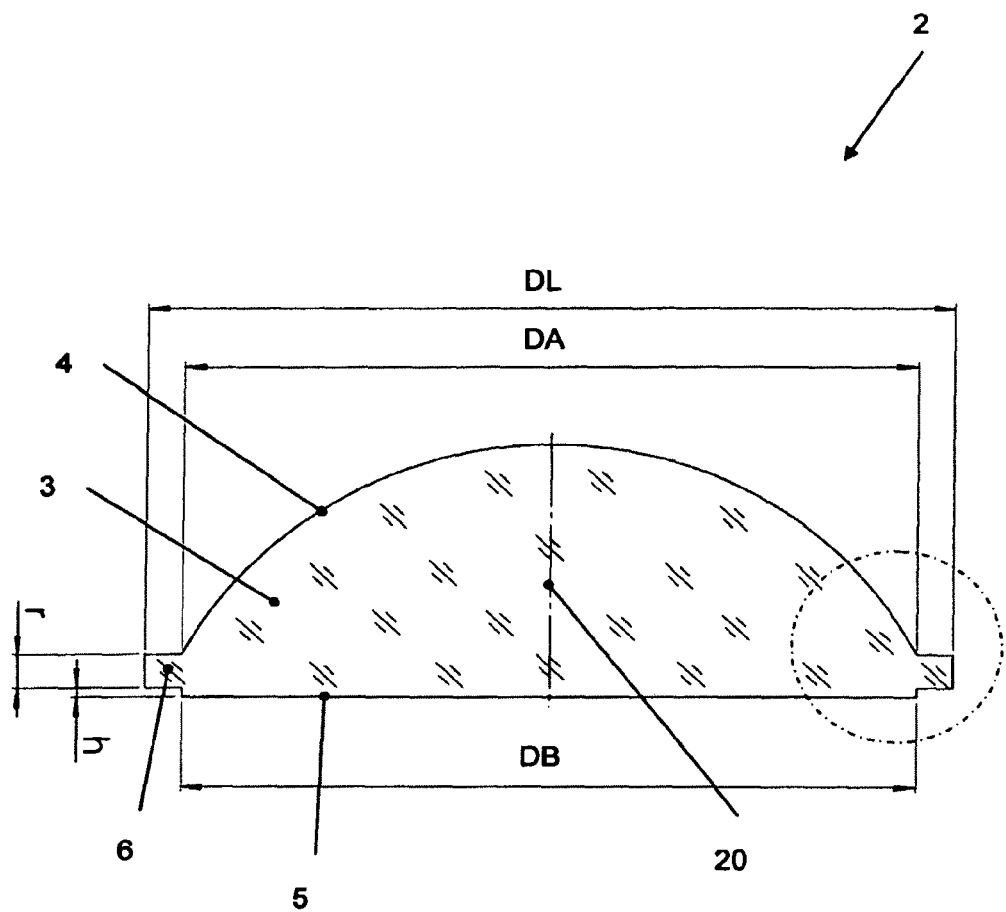
Figure 4:
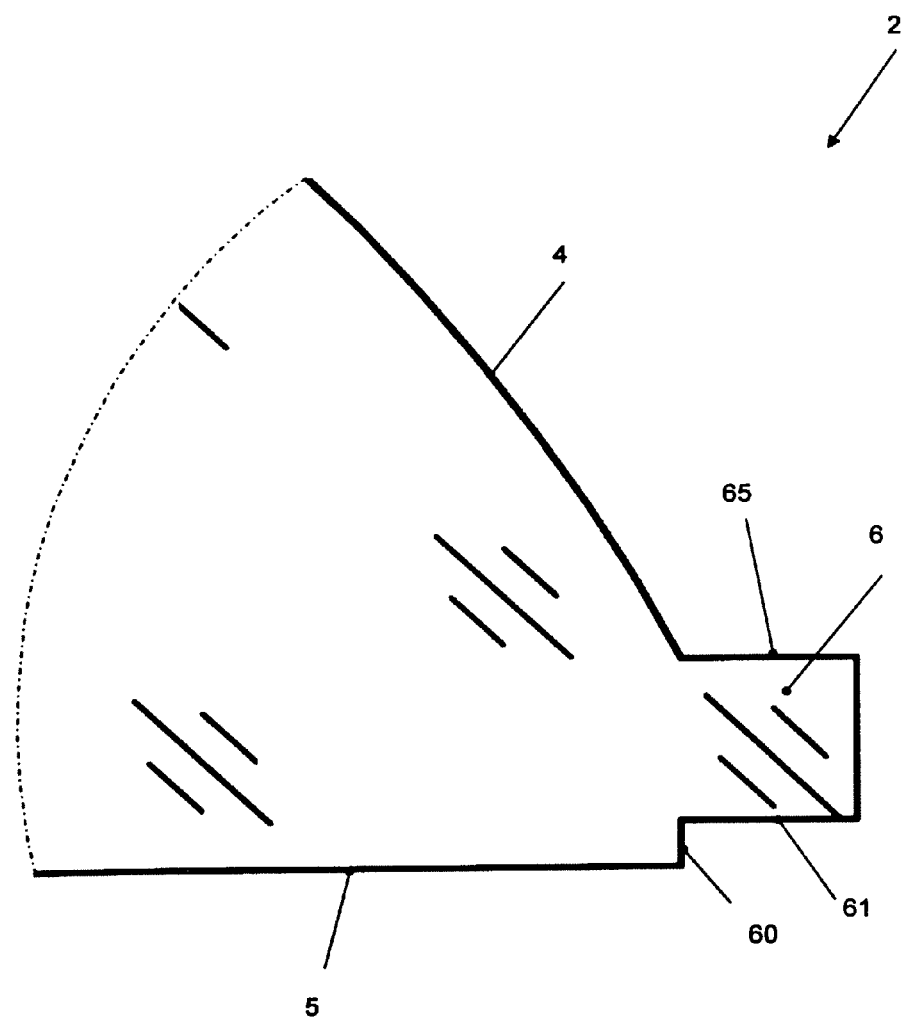
Figure 5:
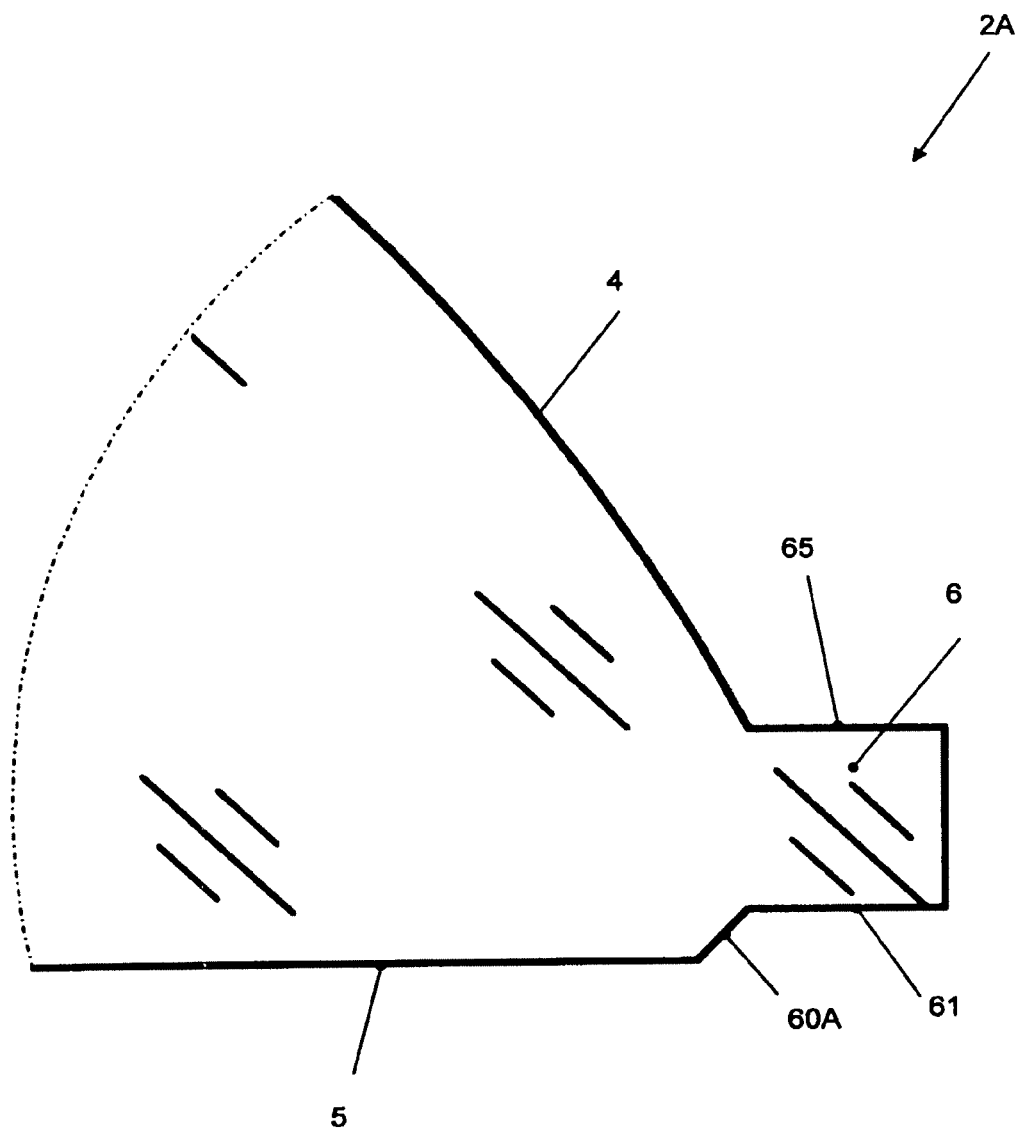
Figure 6:
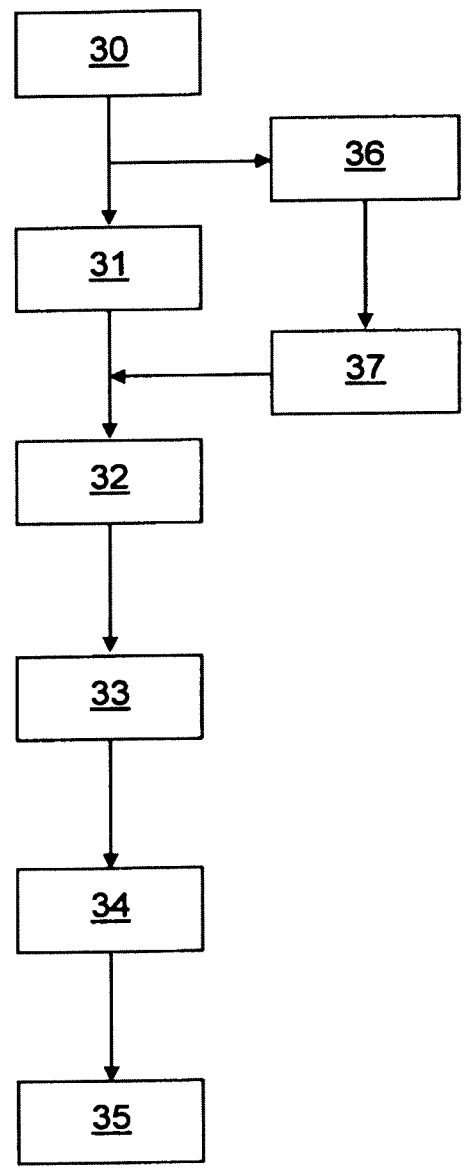
Figure 7:
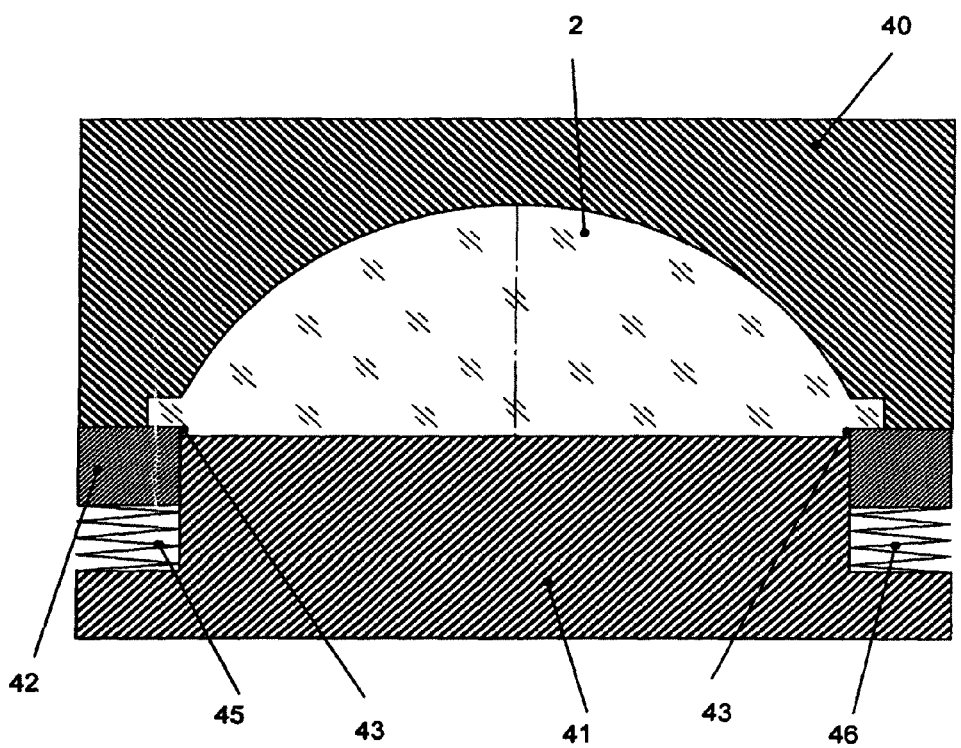
Figure 8:
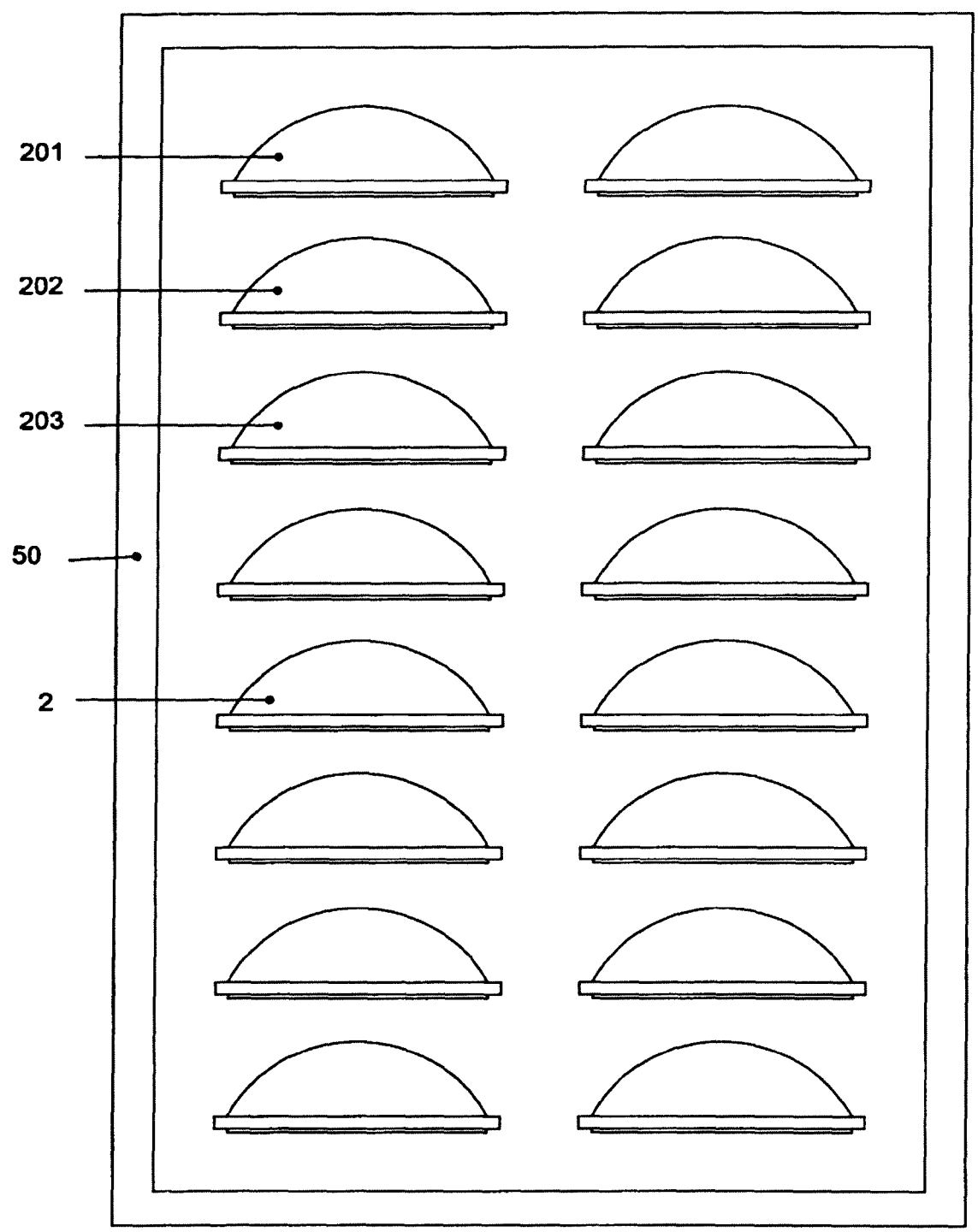
Figure 9:
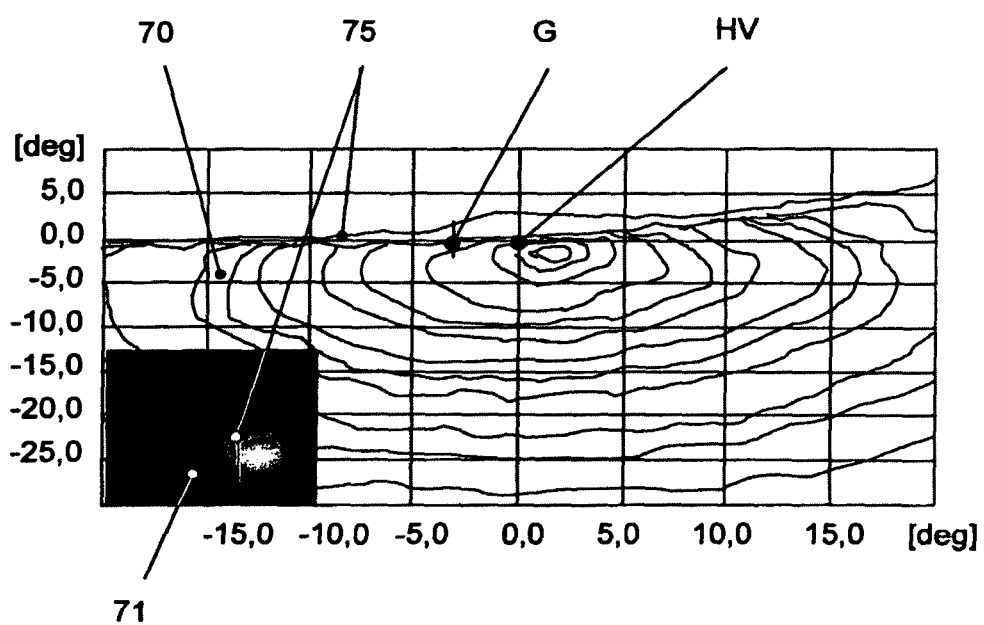

Further advantages and details may be taken from the following specification of examples of embodiment. There is shown in:

FIG. 1 a motor vehicle,

FIG. 2 a schematic representation of a vehicle headlight,

FIG. 3 a cross-section through an example of embodiment of a headlight lens for a vehicle headlight according to FIG. 2, FIG. 4 a cut-out of the cross-section according to FIG. 3, FIG. 5 ,by way of a cut-out, a cross-section through a modified example of embodiment of a headlight lens for a vehicle headlight according to FIG. 2, FIG. 6 a method for manufacturing a headlight lens according to FIG. 3, FIG. 7 an apparatus for pressing a headlight lens according to FIG. 3, FIG. 8 a transport container for transporting a plurality of headlight lenses, and FIG. 9 the distribution of illumination of a headlight.

FIG. 1 shows a motor vehicle 100 having a vehicle headlight 1 schematically depicted in FIG. 2 and having a light source 10 for generating light, a reflector 12 for reflecting light to be generated by means of the light source 10, and a shield 14. The vehicle headlight 1 moreover comprises a one-piece headlight lens 2 blank-moulded on both sides, for changing the beam direction of light to be generated by means of the light source 10, and in particular for imaging an edge of the shield 14 as a light and dark borderline 75 (also see FIG. 9), which edge has been designated by reference numeral 15 in FIG. 2.

The headlight lens 2 comprises a lens body 3 made from transparent material, in particular glass, which body includes an essentially planar, optically effective and operative surface 5 facing the light source 10, and a convexly curved, optically effective and operative surface 4 facing away from the light source 10. The headlight lens 2 moreover comprises an integrally formed lens edge 6, by means of which the headlight lens 2 may be attached inside the vehicle headlight 1. The elements in FIG. 2 have been drafted in particular consideration of simplicity and clearness but not necessarily to scale. For example, the order of magnitude of some elements has been exaggerated with respect to other elements in order to improve comprehension of the example of embodiment of the present invention.

FIG. 3 shows a cross-section through an example of embodiment of the headlight lens 2 for the vehicle headlight 1 according to FIG. 2. FIG. 4 shows a cut-out of the headlight lens 2, said cut-out having been marked by a dashed-dotted circle. The essentially planar, optically effective surface 5 projects, in the shape of a cascade or step 60, beyond the lens edge 6 or beyond the surface 61 of the lens edge 6 facing the light source 10 in the direction of the optical axis 20 of the headlight 2, wherein the height h of the step 60 is no more than 1 mm, advantageously no more than 0.5 mm. The nominal value of the height h of the step 60 advantageously amounts to 0.2 mm. Moreover, the headlight lens 2 has a contact shoulder 65 on the lens edge 6 on that side of the headlight lens 2 which faces away form the step 60.

The thickness r of the lens edge 6 amounts to at least 2 mm, however, to no more than 5 mm. The diameter DL of the headlight lens 2 amounts to at least 40 mm, however, to no more than 100 mm. The diameter DB of the essentially planar, optically effective surface 5 is equal to the diameter DA of the convexly curved, optically effective surface 4. In an expedient embodiment, the diameter DB of the essentially planar, optically effective surface 5 amounts to no more than 110% of the diameter DA of the convexly curved, optically effective surface 4. Furthermore, the diameter DB of the essentially planar, optically effective surface 5 advantageously amounts to at least 90% of the diameter DA of the convexly curved, optically effective surface 4. Advantageously, the diameter DL of the headlight lens 2 is roughly 5 mm larger than the diameter DB of the essentially planar, optically effective surface 5 or than the diameter DA of the convexly curved optically, effective surface 4.

FIG. 5 shows a headlight lens 2A modified with respect to headlight lens 2, wherein same reference numerals as having been used with respect to headlight lens 2 denominate same or similar objects. As a modification with regard to headlight lens 2, headlight lens 2A has an oblique step 60A (e.g. inclined by 45°).

FIG. 6 shows a process for manufacturing the headlight lens 2. Herein, the manufacture of a pre-form, such as e.g. of a gob, occurs in a step 30. To this end, glass is melted in a melting device such as a trough. The melting device may comprise e.g. a controllable outlet. Liquid glass is passed from the melting device into a pre-form device. This pre-form device may include e.g. moulds into which a defined amount of glass is poured. It may also be provided that the pre-form device is designed as in injection press for pressing pre-forms which, if necessary, are close to their final contour. It has been provided that the volume of the pre-form may deviate by up to 3% from the nominal or index value of the pre-form.

A step 31 follows, in which step the pre-form is transferred to a tempering device by means of which the thermal gradient of the pre-form is reversed. Optionally, the pre-form is cooled in a step 36 and warmed up or heated in a step 37 after an indefinite period of time has lapsed.

A step 32 follows in which the pre-form is blank-moulded—by means of an apparatus for pressing a headlight lens as shown in FIG. 7—between a first mould 40 and a second mould, the latter comprising a first mould section 41 and a second mould section 42 which is annular and encloses the first mould section 41, to form a headlight lens 2 having an integrally moulded lens edge 6, wherein the cascade or step 60 is pressed into the headlight lens 2 by means of an offset 43 depending on the volume of the pre-form, which pressing occurs between the first mould section 41 and the second mould section 42. Herein, the pressing is, in particular, not performed in vacuum or under significant low-pressure. The pressing particularly occurs under air-pressure (atmospheric pressure). The first mould section 41 and the second mould section 42 are non-positively coupled together by means of springs 45 and 46. Herein, the pressing is performed such that the distance between the first mould section 41 and the first mould 40 is dependent on the volume of the pre-form or of the headlight lens 2 pressed from it, and the distance between the second mould section 42 and the first mould 40 is independent of the volume of the pre-form or of the headlight lens 2 pressed from it.

After pressing, and in a step 33, the headlight lens 2 is placed on a cooling track and cooled. An optional step 34 follows, in which the essentially planar surface 5 is polished. Subsequently, and in a step 35, the headlight lens 2 is packaged into a transport container 50 represented in FIG. 8 for transporting headlight lenses together with further headlight lenses 201, 202, 203 of the batch, all designed corresponding to headlight lens 2. In the transport container 50, the height of one step of a headlight lens 201 differs by more than 0.05 mm, advantageously by more than 0.1 mm, from the height of a step of a further headlight lens 203.

It has shown that the lens designed according to the invention is robust with regard to its optical properties such that the required optical properties as they have been explained e.g. referring to FIG. 9 may be matched even in the case of the aforementioned deviations of the volume of the pre-form. Thereby, the aforementioned deviations regarding the volume of the pre-form may be tolerated, and the costs for producing such a headlight lens may be reduced.

The invention claimed is:

1. Method for manufacturing a batch comprising at least sixteen headlight lenses for a motor vehicle headlight, wherein each headlight lens comprises a lens body made from transparent material and having an essentially planar, optically operative surface as well as a convexly curved, optically operative surface, the method comprising pressing a pre-form between a first mold for pressing the convexly curved, optically operative surface and a second mold for pressing the essentially planar, optically operative surface, which second mold comprises a first mold section and an annular second mold section enclosing the first mold section, wherein due to the pressing a headlight lens of the batch is formed, the headlight lens having an integrally formed lens edge, wherein, by means of an offset depending on a volume of the pre-form a step is pressed into the headlight lens between the second mold section and the first mold section, wherein the first mold section is set back with respect to the second mold section at least in a region of the offset, and wherein a height of a step of a headlight lens of the batch differs by more than 0.05 mm from a height of a step of at least one further headlight lens of the batch.

2. Method as claimed in claim 1, wherein a distance between the first mold section and the first mold depends on the volume of the pre-form.

3. Method as claimed in claim 2, wherein a distance between the second mold section and the first mold is independent of the volume of the pre-form.

4. Method as claimed in claim 3, wherein the second mold section contacts the first mold.

5. Method as claimed in claim 1, wherein a contact shoulder is pressed into the lens edge by means of the first mold.

6. Method as claimed in claim 5, wherein the contact shoulder extends essentially orthogonally with respect to an optical axis of the headlight lens.

7. Method as claimed in claim 1, wherein the essentially planar, optically operative surface projects beyond the lens edge or a part of the lens edge by no more than 1 mm when seen in the direction of an optical axis of the headlight lens.

8. Method as claimed in claim 1, wherein a thickness of the lens edge amounts to at least 2 mm.

9. Method as claimed in claim 1, wherein a thickness of the lens edge amounts to no more than 5 mm.

10. Method as claimed in claim 1, wherein a diameter of the essentially planar, optically operative surface amounts to no more than 110% of a diameter of the convexly curved, optically operative surface.

11. Method as claimed in claim 1, wherein a diameter of the essentially planar, optically operative surface amounts to at least 90% of a diameter of the convexly curved, optically operative surface.

12. Method as claimed in claim 1, wherein the headlight lenses are placed in a transport container for transporting the headlight lenses.

13. Batch of pressed headlight lenses for vehicle headlights having an integrally molded lens edge, wherein each one of the headlight lenses of the batch comprises
a lens body, each, made from a pre-form of transparent material and each with an essentially planar, optically operative surface, and a convexly curved, optically operative surface,
wherein the essentially planar, optically operative surfaces project, in the form of a step and when seen in a direction of a respective optical axis of a headlight lens, beyond the respective lens edge or part of the respective lens edge,
wherein a height of a step of a headlight lens of the batch differs by more than 0.1 mm from a height of a step of at least one further headlight lens of the batch, and wherein the said height of a step is formed by means of an offset between mold section and the height of a step depends on a volume of the pre-form pressed into the headlight lens between mold section.

14. Batch as claimed in claim 13, wherein the batch comprises at least five hundred headlight lenses.

15. Batch as claimed in claim 13, wherein the headlight lenses of the batch have a contact shoulder, each, on the lens edge situated on a side of the respective headlight lenses facing away from the step.

16. Batch as claimed in claim 15, wherein the contact shoulder extends essentially orthogonally with respect to the optical axis of the headlight lens.

17. Batch as claimed in claim 13, wherein the essentially planar, optically operative surface projects, when seen in the direction of the optical axis of the headlight lens, beyond the lens edge or part of the lens edge by no more than 1 mm.

18. Batch as claimed in claim 13, wherein a thickness of the lens edge amounts to at least 2 mm.

19. Batch as claimed in claim 13, wherein a thickness of the lens edge amounts to no more than 5 mm.

20. Batch as claimed in claim 13, wherein a diameter of the essentially planar, optically operative surface amounts to no more than 110% of a diameter of the convexly curved, optically operative surface.

21. Batch as claimed in claim 13, wherein a diameter of the essentially planar, optically operative surface amounts to at least 90% of a diameter of the convexly curved, optically operative surface.

22. Transport container for transporting headlight lenses, wherein a plurality of headlight lenses for motor vehicle headlights is arranged in the transport container, wherein each one of the headlight lenses of said plurality of headlight lenses comprises
a pressed lens body made from a pre-form of transparent material with an essentially planar, optically operative surface, each, and with an convexly curved, optically operative surface, each, and
wherein each one of the headlight lenses of the plurality of headlight lenses externally comprises a lens edge, each, on their convexly curved, optically operative surfaces,
wherein the essentially planar, optically operative surfaces, when seen in a direction of a respective optical axis of a headlight lens, project, in a form of a step, beyond the respective lens edge or a part of the respective lens edge,
wherein a height of a step of a headlight lens of said plurality of headlight lenses differs by more than 0.05 mm from a height of a step of at least one further headlight lens of said plurality of headlight lenses, and wherein the said height of a step is formed by means of an offset between mold sections and the height of a step depends on a volume of the pre-form pressed into the head lens between mold sections.

23. Headlight lens for a motor vehicle headlight, the headlight lens comprising: a pressed lens body made from a pre-form of transparent material and having an essentially planar, optically operative surface and a convexly curved, optically operative surface, wherein the essentially planar, optically operative surface has a roughness of less than 0.1 μm a lens edge, wherein the essentially planar, optically operative surface, when seen in a direction of an optical axis of the headlight lens, projects beyond the lens edge or a part of the lens edge in a stepped manner, a contact shoulder on the lens edge on a side of the headlight lens facing away from the step, and wherein a height of a step is formed by means of an offset between mold sections and the height of a step depends on a volume of the pre-form pressed into the headlight lens between the mold sections.

24. Headlight lens as claimed in claim 23, wherein the contact shoulder extends essentially orthogonally with respect to the optical axis of the headlight lens.

25. Headlight lens as claimed in claim 23, wherein the essentially planar, optically operative surface projects beyond the lens edge or a part of the lens edge, when seen in the direction of the optical axis of the headlight lens, by not more than 1 mm.

26. Headlight lens as claimed in claim 23, wherein a thickness of the lens edge amounts to at least 2 mm.

27. Headlight lens as claimed in claim 23, wherein a thickness of the lens edge amounts to no more than 5 mm.

28. Headlight lens as claimed in claim 23, wherein a diameter of the essentially planar, optically operative surface amounts to no more than 110% of a diameter of the convexly curved, optically operative surface.

29. Headlight lens as claimed in claim 23, wherein a diameter of the essentially planar, optically operative surface amounts to at least 90% of a diameter of the convexly curved, optically operative surface.

30. Motor vehicle headlight, having a light source; a shield; and a headlight lens for imaging an edge of the shield as a light and dark borderline; the headlight lens comprising a pressed lens body made from a pre-form of transparent material; an essentially planar, optically operative surface facing the light source wherein the essentially planar, optically operative surface has a roughness of less than 0.1 µm; a convexly curved optically operative surface facing away from the light source; a lens edge on the optically operative surface facing away from the light source, wherein the optically operative surface facing the light source projects beyond the lens edge or a part of the lens edge when seen in a direction of an optical axis of the headlight lens and/or in a direction of the light source, wherein a step is provided between the optically operative surface facing the light source and a surface of the lens edge facing the light source; a contact shoulder on the lens edge on a side of the headlight lens facing away from the step, and wherein a height of a step is formed by means of an offset between mold sections and the height of a step depends on a volume of the pre-form pressed into the headlight lens between the mold sections.

31. Vehicle headlight as claimed in claim 30, wherein a gradient of the light and dark borderline is no more than 0.5.

32. Vehicle headlight as claimed in claims 31, wherein a glare value of the vehicle headlight is no more than 1.5 Lux.

* * * * *

UNITED STATES PATENT AND TRADEMARK OFFICE
CERTIFICATE OF CORRECTION

| | | |
|---|---|---|
| PATENT NO. | : 8,414,170 B2 | Page 1 of 1 |
| APPLICATION NO. | : 13/532998 | |
| DATED | : June 26, 2012 | |
| INVENTOR(S) | : Erward et al. | |

It is certified that error appears in the above-identified patent and that said Letters Patent is hereby corrected as shown below:

On the title page, Item [73] "Doctor Optics GmbH" should be changed to --Docter Optics GmbH--.

Signed and Sealed this
Third Day of September, 2013

Teresa Stanek Rea
*Acting Director of the United States Patent and Trademark Office*